US008468130B2

(12) United States Patent
Bhandari et al.

(10) Patent No.: US 8,468,130 B2
(45) Date of Patent: Jun. 18, 2013

(54) ASSISTED HYBRID MOBILE BROWSER

(75) Inventors: Nitin Bhandari, Fremont, CA (US); Erik R. Swenson, San Jose, CA (US); Geoffrey Dale Benson, Sunnyvale, CA (US); Ishika Paul, Mountain View, CA (US); James Marzano, Sunnyvale, CA (US); Jaime Heilpern, San Francisco, CA (US); Robert Oberhofer, Belmont, CA (US); Michael Guzewicz, Campbell, CA (US); Vijay Kumar, Santa Clara, CA (US)

(73) Assignee: Skyfire Labs, Inc., Mountain View, CA (US)

( * ) Notice: Subject to any disclaimer, the term of this patent is extended or adjusted under 35 U.S.C. 154(b) by 60 days.

(21) Appl. No.: 13/079,699

(22) Filed: Apr. 4, 2011

(65) Prior Publication Data

US 2011/0289108 A1 Nov. 24, 2011

Related U.S. Application Data

(60) Provisional application No. 61/320,683, filed on Apr. 2, 2010.

(51) Int. Cl.
*G06F 7/00* (2006.01)

(52) U.S. Cl.
USPC .......................................................... 707/621

(58) Field of Classification Search
USPC .......................................................... 707/621
See application file for complete search history.

(56) References Cited

U.S. PATENT DOCUMENTS

| | | | |
|---|---|---|---|
| 7,567,575 B2 | 7/2009 | Chen et al. | |
| 2006/0198392 A1 | 9/2006 | Park et al. | |
| 2007/0282819 A1 | 12/2007 | Lynn et al. | |
| 2008/0184128 A1 | 7/2008 | Swenson et al. | |
| 2008/0195698 A1 | 8/2008 | Stefanovic et al. | |
| 2008/0222199 A1 | 9/2008 | Tiu et al. | |
| 2009/0031381 A1 | 1/2009 | Cohen et al. | |
| 2009/0044106 A1 | 2/2009 | Berkner et al. | |
| 2009/0234876 A1 | 9/2009 | Schigel et al. | |
| 2010/0268836 A1 | 10/2010 | Jabri et al. | |
| 2010/0281042 A1* | 11/2010 | Windes et al. | 707/756 |
| 2010/0299453 A1 | 11/2010 | Fox et al. | |
| 2011/0119585 A1* | 5/2011 | Kim | 715/719 |
| 2011/0265134 A1 | 10/2011 | Jaggi et al. | |

OTHER PUBLICATIONS

PCT International Search Report and Written Opinion, PCT Application No. PCT/US11/31124, Jun. 13, 2011, 12 pages.

* cited by examiner

*Primary Examiner* — Truong Vo
(74) *Attorney, Agent, or Firm* — Fenwick & West LLP

(57) ABSTRACT

A system and a method are disclosed for identifying video files on a webpage and streaming video files to a client device. A server receives browsing data including uniform resource locator for a webpage and identifies missing videos on the webpage. The server identifies a source file for the missing videos including identifying a location for each missing video. The server retrieves a thumbnail for each missing video and provides it to a client device. Additionally, the server transcodes the video file responsive to a user input provided by a user. The transcoded video is streamed to the client device.

24 Claims, 11 Drawing Sheets

Server 102
Catalog Module 304
Streaming Module 306
NETWORK 106
Client 104
Browser 110
Communications Module 112
Augmentation Module 114
RTSP Server 116

Receive Page URL 802
URL Known? 804
Yes
Download File 806
Transcode File 808
No
Open Browser 810
Load User Data 812
Source File Located? 814
No
Create Plugin Renderer 816
Render Content 818
Encode Frames 820
Yes
Create Transcoder 822
Process Each Frame 824
Encode Frames 826
Send Trancoded Data 828

1102

1104 sky SPORTS WORLD CUP

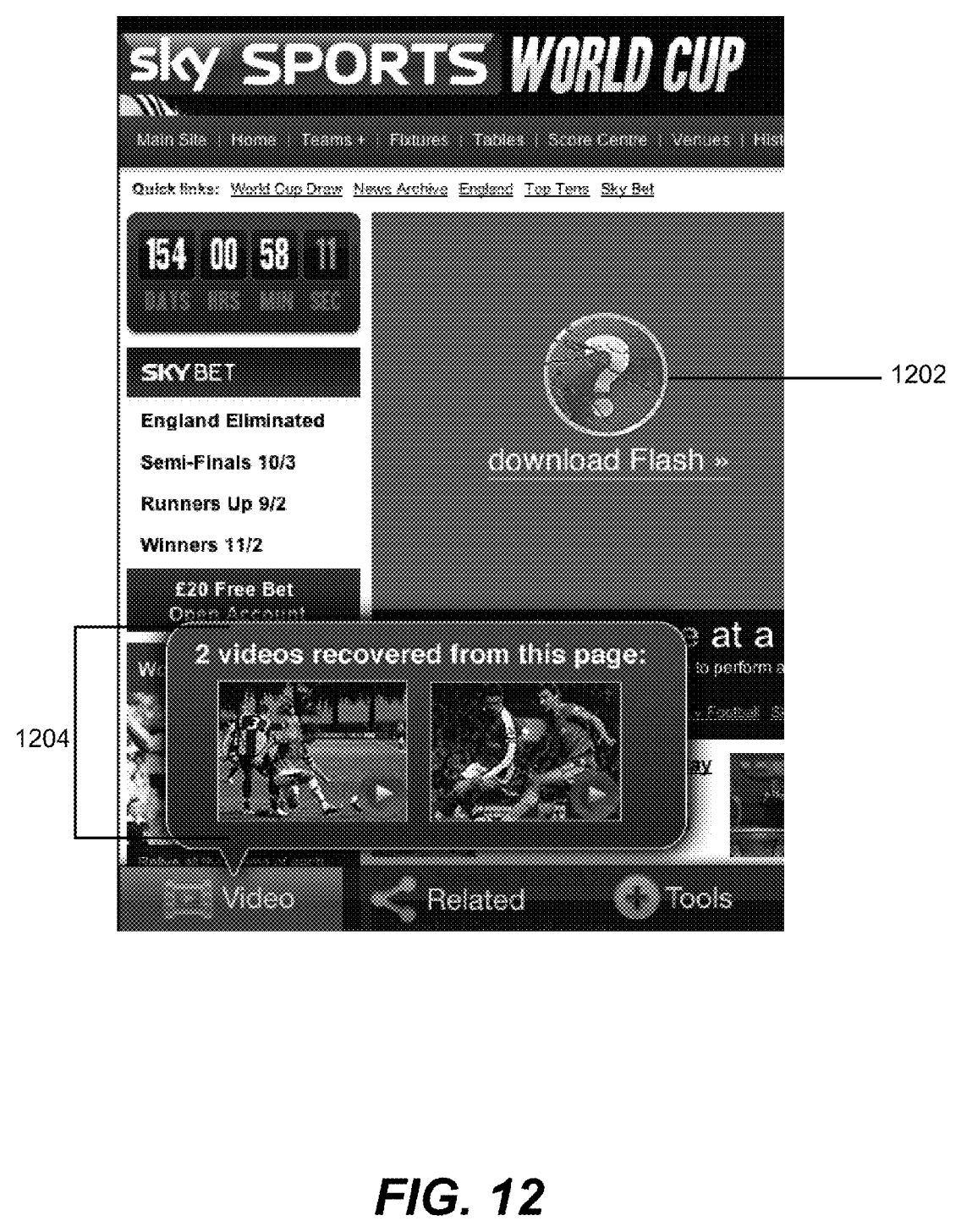

Main Site | Home | Teams + | Fixtures | Tables | Score Centre | Venues | Hist

Quick links: World Cup Draw News Archive England Top Tens Sky Bet 154 00 58 11

DAYS HRS MIN SEC

SKY BET

England Eliminated

Semi-Finals 10/3

Runners Up 9/2

Winners 11/2

£20 Free Bet

Open Account download Flash »

1202

2 videos recovered from this page:

1204

Video Related Tools

*FIG. 12*

ASSISTED HYBRID MOBILE BROWSER

CROSS REFERENCE TO RELATED APPLICATIONS

This application claims the benefit of U.S. Provisional Application No. 61/320,683 filed on Apr. 2, 2010, which is incorporated by reference in its entirety.

BACKGROUND

1. Field of Art

The disclosure generally relates to the field of displaying content on web browsers executing on computing devices, and in particular to displaying video content on a web browser.

2. Description of the Related Art

Web browsers executing on mobile computing devices are used to display a variety of content retrieved over a network. For example, web browsers can be used to view photos, read news articles, play games, perform searches in search engines, etc. However, mobile web browsers typically also need plugins to display certain types of videos. For example, most browsers require an ADOBE FLASH plugin in order to render and display videos encoded in a FLASH format. Thus, mobile web browsers that do not have such plugins installed may not be able display videos encoded in FLASH format. Some operating systems executing on mobile devices may not permit plugins to operate and display certain video content on a mobile web browser. As such, users may be unable to watch videos provided on a webpage. In some instances, an operating system may provide another application to display videos encoded in certain formats. However, such an instance provides a cumbersome web browsing experience to a user as a user may have to switch between two or more applications to view a video and/or may not be able to view certain content displayed on a webpage.

Web services such a social networking systems and other applications that require heavy use of a network's resources are also becoming prevalent. Mobile device users typically access and view their social networking accounts using an application executing on the mobile device. However, users browsing a webpage on a mobile web browser typically have to close the web browser, end their browsing session and execute another application to view their social networking system data. As such, web browsers and social networking system applications may provide a poor user experience to a user who may want to view his or her social networking system data without interrupting or terminating his or her web browsing session.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 12 illustrates one embodiment of a user interface for displaying thumbnails of two videos recovered from a webpage.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system, method and computer readable storage medium that includes a video adaptation module for cataloging videos on a webpage, transcoding the videos and streaming the videos to a client device. A server receives browsing data including uniform resource locator for a webpage and identifies missing videos on the webpage. The server identifies a source file for the missing videos including identifying a location for each missing video. The server retrieves a thumbnail for each missing video and provides it to a client device. Additionally, the server transcodes the video file responsive to a user input provided by a user. The transcoded video is streamed to the client device.

System Architecture

Figure 1:
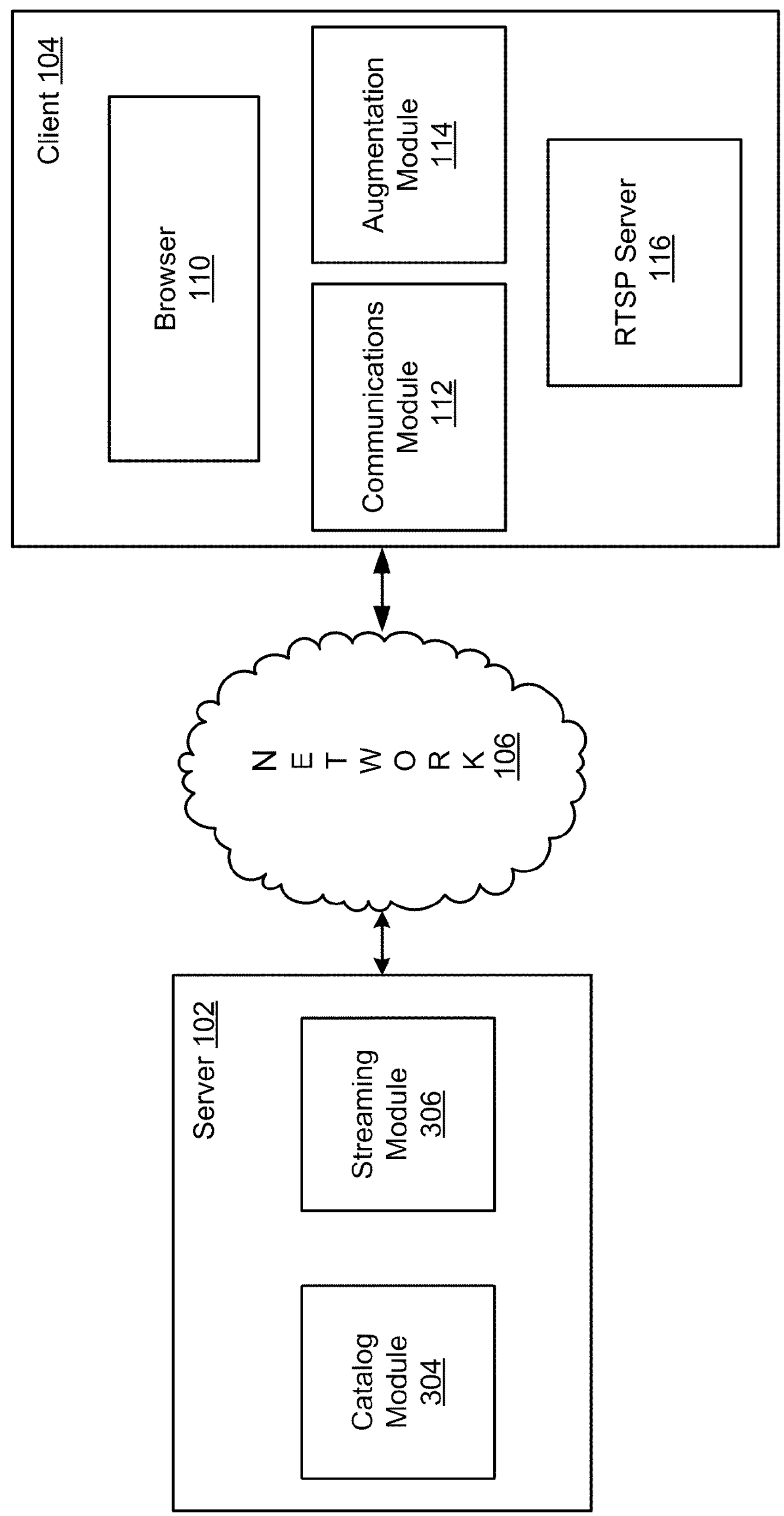
FIG. 1 illustrates one embodiment of a client-server architecture for providing web content to server.

FIG. 1 illustrates one embodiment of a client-server architecture for providing web content to a server and a client. The server 102 includes a number of server application instances executing on the server 102, including a catalog module 304 and a streaming module 306. The server 102 communicates with a client device 104 over a network 106. The client device 104 includes a browser 110, a communications module 112 and an augmentation module 114.

The client 104 is an electronic device used by a user to perform tasks such as retrieving and viewing webpages hosted over a network 106, play music, etc. The client 104 may be a mobile telephone, tablet computer, a laptop computer or a desktop computer. Thus, as used herein the term "client" or "computer" encompasses a wide variety of computing devices.

A browser 110 is an application executing on the client 104 and is typically used for retrieving and presenting resources accessed over a network 106. In one embodiment the browser 110 is a web browser displaying a webpage retrieved from a web server via a network 106. Examples of the browser 108 include, for example, SKYFIRE, GOOGLE CHROME, MOZILLA FIREFOX, APPLE SAFARI, and MICROSOFT INTERNET EXPLORER.

The browser 110 loads a webpage responsive to a user request and displays the webpage to the user on the client device 104. In one embodiment, the webpage contains a video encoded in an encoding format, such as ADOBE FLASH. However, the browser 110 may not support an ADOBE FLASH plugin that may decode and display the video on the webpage. Thus, browser 110 may load the requested webpage regardless of whether some portions of the webpage can be processed by the browser 110. In one embodiment, the browser interfaces with a communications module 112 to send the webpage information to a server 102.

The communications module 112 interfaces with browser 110 and sends webpage information retrieved by the browser 110 to a server 102. In one embodiment, the communications module 112 sends a uniform resource locator (URL) identifying the requested webpage to a server 102 via the network 106. In other embodiments, the communications module 112 sends cookies associated with the webpage to the server 102. The URL and cookie information may be sent using the Hypertext Transfer Protocol (HTTP).

The network 106 represents the communication pathways between the server 102 and the client 104. In one embodiment, the network 110 is the Internet. The network 106 can also utilize dedicated or private communications links that are not necessarily part of the Internet. In one embodiment, the network 106 uses standard communications technologies and/or protocols. Thus, the network 106 can include links using technologies such as Ethernet, Wi-Fi (802.11), integrated services digital network (ISDN), digital subscriber line (DSL), asynchronous transfer mode (ATM), etc. Similarly, the networking protocols used on the network 106 can include multiprotocol label switching (MPLS), the transmission control protocol/Internet protocol (TCP/IP), the hypertext transport protocol (HTTP), the simple mail transfer protocol (SMTP), the file transfer protocol (FTP), etc. In one embodiment, at least some of the links use mobile networking technologies, including general packet radio service (GPRS), enhanced data GSM environment (EDGE), long term evolution (LTE), code division multiple access 2000 (CDMA2000), and/or wide-band CDMA (WCDMA). The data exchanged over the network 106 can be represented using technologies and/or formats including the hypertext markup language (HTML), the extensible markup language (XML), the wireless access protocol (WAP), the short message service (SMS) etc. In addition, all or some of the links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

The server 102 receives a webpage URL and cookies associated with the webpage from a client device 104 over a network 106 and process the webpages. The server 102 may be a computing device capable of executing commands. For example, the server 102 may be a computer, a server or multiple servers linked together by a communications link. The server 102 is described in greater detail in reference to FIG. 2. In one embodiment, the server 102 provides the webpage URL and cookies to the catalog module 304 executing on the server 102.

The catalog module 304 identifies any missing videos, related videos and other related content associated with a webpage received by the server. A missing video is a video that cannot be displayed on a mobile browser 110 executing on the client device because the client device 104 does not permit certain video plugins on the browser or a video that can by optimized by the server 102. In an embodiment wherein missing videos are identified on a webpage, the catalog module 304 retrieves a snapshot of the video, wherein the snapshot is provided to the client device 104 as a thumbnail. Additionally, the catalog module 304 identifies videos and other web content, including social networking data related to contents of the webpage. In an instance wherein a video related to the webpage is identified, the catalog module 304 retrieves a snapshot of the video and sends it as a thumbnail to the client device 304. The catalog module 304 generates a response comprising the total number of missing or related videos found, information identifying each video and a URL for a thumbnail image for each video. The response is sent to the client device 104 via a network 106.

The client 104 receives the thumbnail images sent by the server 102, wherein the augmentation module 114 displays the thumbnail images via various user interface components on the browser 110. For example, the thumbnails may be displayed with the webpage displayed by the browser 110 or it can be shown in a separate user interface layer. In one embodiment, the browser 110 receives an input from a user indicating a request to play a video associated with the thumbnail. In such an instance, the browser 110 sends user request to the server 102 via a network 106.

The streaming module 306 processes a request to play a video received from a client device 104. In one embodiment, if the request is associated with a missing video, the streaming module 306 transcodes the video to a format capable of being displayed on the browser 110. For example, if the streaming module 306 receives a request to play a missing video encoded in ADOBE FLASH format, the video is transcoded to another format and sent to the client device 104. In another embodiment, the streaming module 306 may also transcode a video that can be displayed on a browser executing on the client device 104, but cannot be streamed adaptively. In such an instance, the streaming module 306 adaptively transcodes the video based on various factors such as network health, client 104 processing capabilities and such. The streaming module 306 sends the transcoded video data to the client device 104 such that it can be played on a browser 110 executing on the client device 104. The transcoded videos can be sent using a variety of communications protocols, including but not limited to, Transmission Control Protocol (TCP) and Hypertext Transfer Protocol (HTTP).

The client 104 receives the transcoded videos and displays the video to a user. In one embodiment, the client 104 receives the transcoded videos via HTTP and displays the video using HTTP streaming. In other embodiment, wherein for example, the client device 104 does not support HTTP streaming, the RTSP server 116 transfers data to a media player executing on the client device 104. The RTSP server 116 opens a TCP connection with the server 102. The RTSP server 116 receives audio, video and metadata over the TCP connection, reads the data as it becomes available from the network and sends it to the media player over local UDP connections. Additionally, the RTSP server 116 transfers data to the media player in a controlled manner. In one embodiment, the RTSP server 116 measures a difference between a presentation time of the last sent data from the server 102 against a current play position of the media player executing on the client device 104. If the RTSP server 116 detects that the sent data and the play position are close to each other, or that the player is in buffering state, the RTSP server feeds data to the player at a faster rate. If the RTSP server 116 is ahead to the player's play position, the RTSP server 116 sends data to the media player at a predetermined rate faster than real-time play rate. If the RTSP server 116 is ahead by more than predetermined value, the RTSP server 116 sends information to the media player at a rate slower than real-time play rate. As such, the RTSP server 116 prevents the server from overflowing the media player's internal frame buffer. In other embodiments, the network can use a pre-buffering or a re-buffering mechanism to determine a rate at which to provide data to the RTSP server 116. For example, the network can compare the encoded video rate and duration against the actual network rate to determine the rate of data transfer. In such an instance, the media player can be paused or its creation can be delayed until the RSTP server 116 is provided with adequate data to feed the media player.

Computing Machine Architecture

Figure 2:
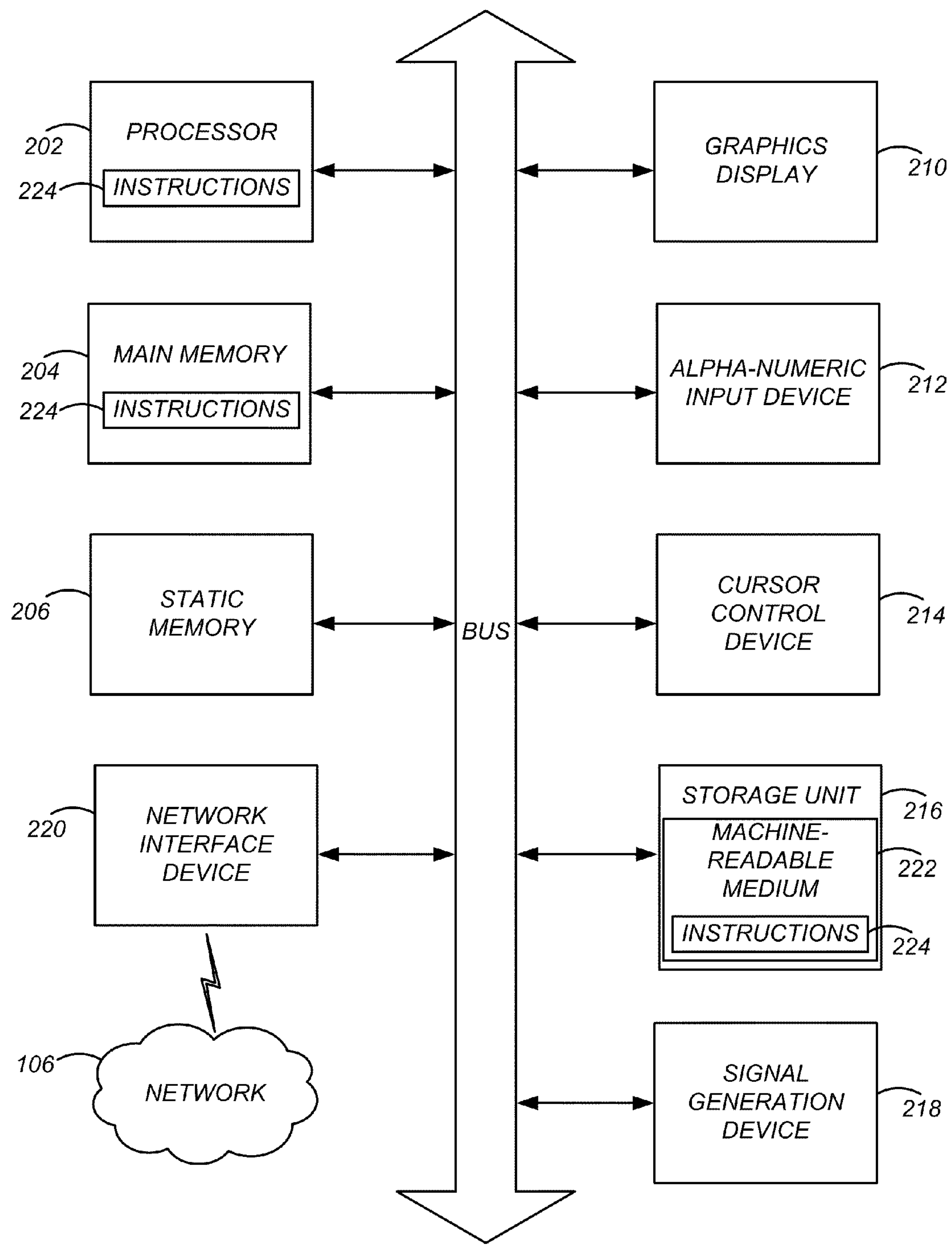
FIG. 2 illustrates one embodiment of components of an example machine able to read instructions from a machine-readable medium and execute them in a processor (or controller).

FIG. 2 is a block diagram illustrating components of an example machine able to read instructions from a machine-readable medium and execute them in a processor (or controller). The machine of FIG. 2 describes any computing system described in the specification, including the server 102 and the client device 104. FIG. 2 shows a diagrammatic representation of a machine in the example form of a computer system within which instructions 224 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 224 (sequential or otherwise) that specify actions to be taken by that machine. Further, while only a single machine is illustrated, the term "machine" shall also be taken to include any collection of machines that individually or jointly execute instructions 224 to perform any one or more of the methodologies discussed herein.

The example computer system includes a processor 202 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 204, and a static memory 206, which are configured to communicate with each other via a bus 108. The computer system may further include graphics display unit 210 (e.g., a plasma display panel (PDP), a liquid crystal display (LCD), a projector, or a cathode ray tube (CRT)). The computer system may also include alphanumeric input device 212 (e.g., a keyboard), a cursor control device 214 (e.g., a mouse, a trackball, a joystick, a motion sensor, or other pointing instrument), a storage unit 216, a signal generation device 218 (e.g., a speaker), and a network interface device 820, which also are configured to communicate via the bus 108.

The storage unit 216 includes a machine-readable medium 222 on which is stored instructions 224 (e.g., software) embodying any one or more of the methodologies or functions described herein. The instructions 224 (e.g., software) may also reside, completely or at least partially, within the main memory 204 or within the processor 202 (e.g., within a processor's cache memory) during execution thereof by the computer system, the main memory 204 and the processor 202 also constituting machine-readable media. The instructions 224 (e.g., software) may be transmitted or received over a network 106 via the network interface device 220.

While machine-readable medium 222 is shown in an example embodiment to be a single medium, the term "machine-readable medium" should be taken to include a single medium or multiple media (e.g., a centralized or distributed database, or associated caches and servers) able to store instructions (e.g., instructions 224). The term "machine-readable medium" shall also be taken to include any medium that is capable of storing instructions (e.g., instructions 224) for execution by the machine and that cause the machine to perform any one or more of the methodologies disclosed herein. The term "machine-readable medium" includes, but not be limited to, data repositories in the form of solid-state memories, optical media, and magnetic media.

Identifying and Streaming Webpage Content

Figure 3:
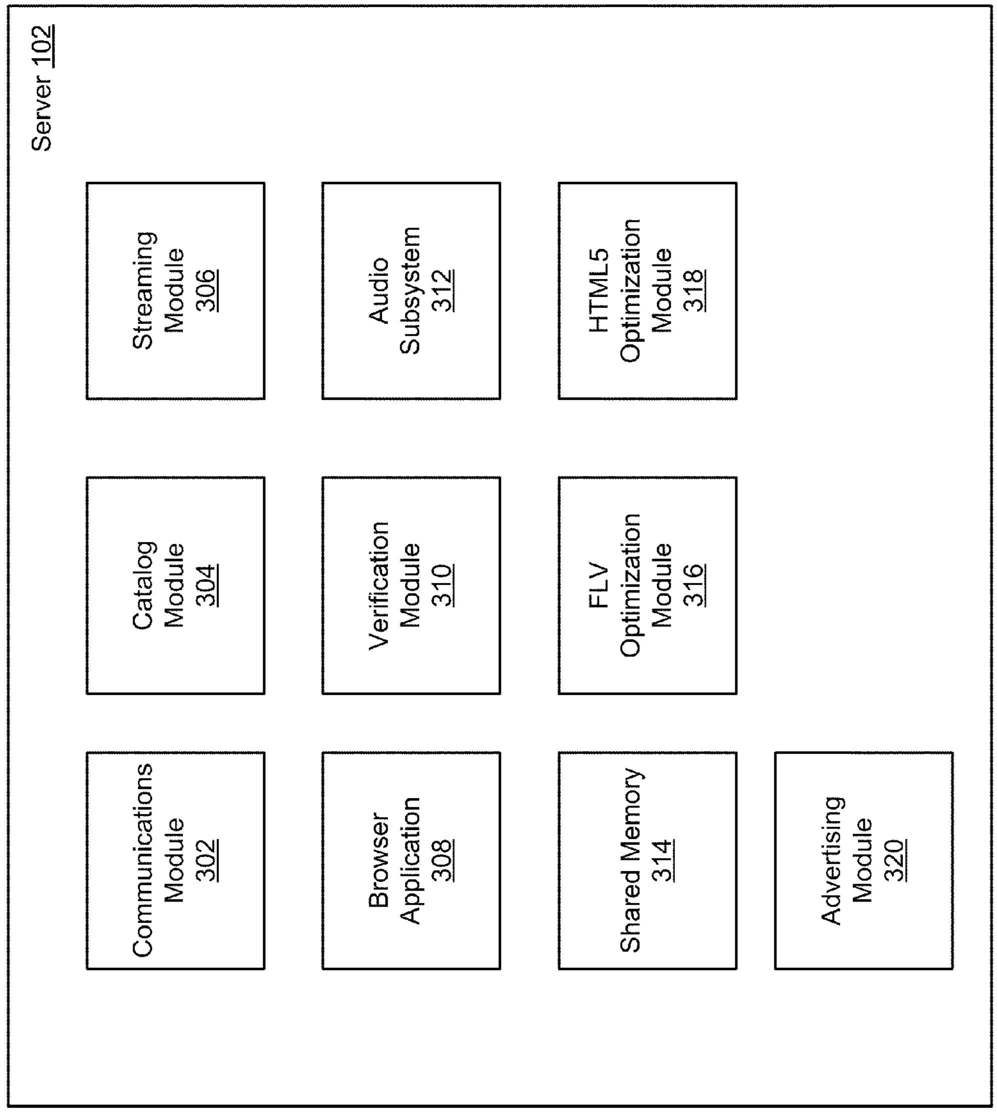
FIG. 3 illustrates one embodiment of a server for providing web content to one or more client devices.

FIG. 3 illustrates one embodiment of a server 102 for providing web content to one or more client devices 104. The server includes a communications module 302, a catalog module 304, a streaming module 306, a browser application 308, a verification module 310, an audio subsystem 312, shared memory 314, a flash video (FLV) optimization module 316, an HTML5 optimization module 318 and an advertising module 320.

The communications module 302 interfaces with the network 106 to send and receive (e.g. communicatively couple) data. In one embodiment, the communications module 302 is configured to receive and send information from the client 104 using an HTTP communications protocol and send information to the client using a transmission control protocol (TCP) or a user datagram protocol (UDP) protocol such as hypertext transfer protocol Live Streaming (HLS) or a proprietary TCP streaming protocol. For example, the communications module 302 may be configured to receive a webpage URL from the client 104 using HTTP and send video streaming information using HLS.

For HTTP streaming, the communications module 302 takes audio and video samples and encapsulates them into an MPEG-2 Transport stream. The communications module 302 creates index files needed by the client's media player. In one embodiment, the communications module 302 may provide the encapsulated data using HTTP requests from the client device 104. In another embodiment, the communications module 302 writes the files to another server or file system that allows the client device 104 to talk directly to an HTTP server.

In one embodiment, the proprietary TCP streaming protocol is used if the client device 104 does not support HTTP streaming. In such an instance, the communications module 302 packages a series of video, audio and metadata into TCP packets. The packets contain timestamps, sequence numbers, length, type and payload information associated with the video such that a client device 104 may take the data and feed it into a custom media player. In another embodiment, the RTSP server 116 executing on the client device 104 may receive the TCP packets and stream the video on the client device as described in reference to FIG. 1.

In one embodiment, the communications module receives content, including ADOBE FLASH, HTML5, progressive download content and adaptive bitrate content such as SILVERLIGHT and HLS from the client device 104 or a network interception module. The communications module 302 also routes the information received from the client 104 to the catalog module 304 or the streaming module 306. For example, if a server 102 receives a webpage URL from the communications module 112 executing on the client 104, the communications module 302 routes the URL to the catalog module 304. On the other hand, if the server 102 receives a request to play a video on a webpage, the communications module 302 routes the request to the streaming module 306.

The catalog module 304 analyzes a webpage loaded by a browser executing on a client device 104 and sent to the server 102. In one embodiment, the catalog module 304 parses a webpage to identify videos retrieves content related to the content of the webpage, retrieves a thumbnail associated with each video and interfaces with the communications module 302 to send the information to the client 104. Responsive to the information, the client may display a thumbnail associated with each video such that a user can decide whether he or she wants to play the video on the client device 104. The catalog module 304 is described in greater detail below in reference to FIG. 4.

Figure 4:
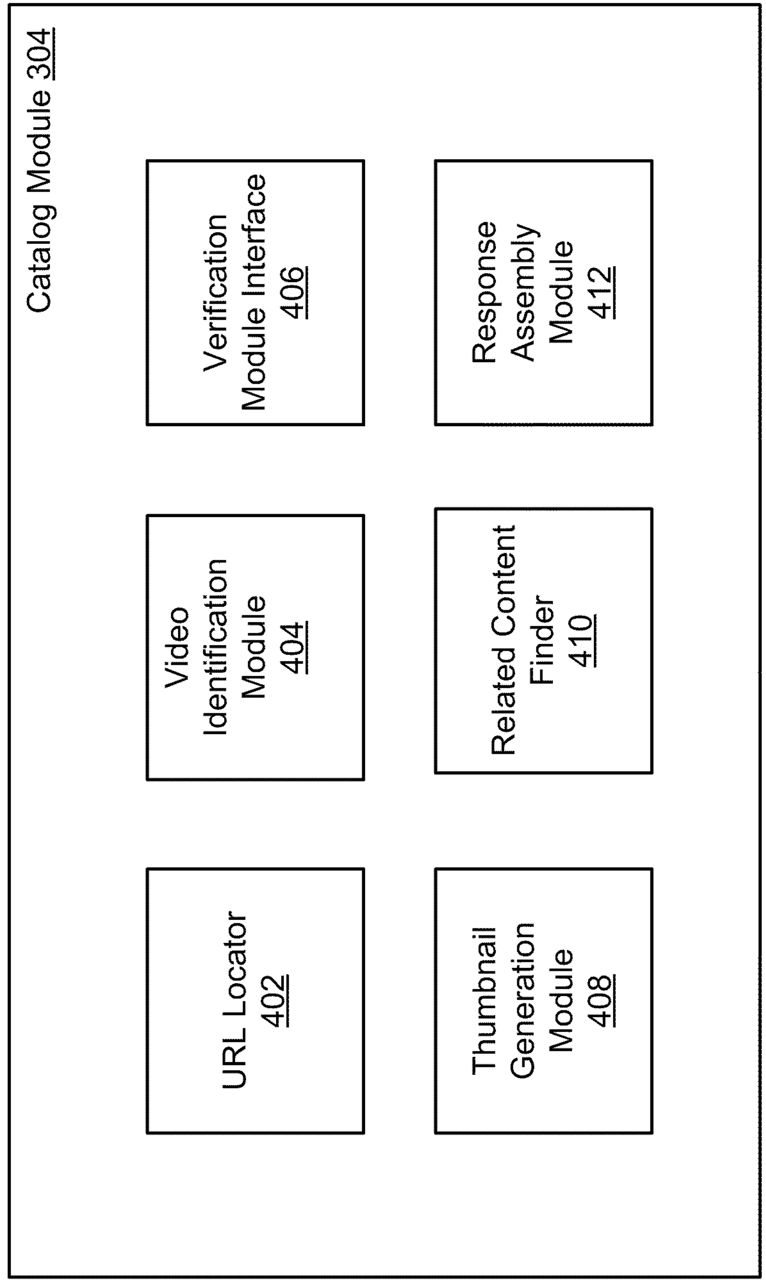
FIG. 4 illustrates one embodiment of a catalog module for providing web content to one or more client devices.

FIG. 4 illustrates one embodiment of a catalog module 304 for analyzing a webpage received from a client 104. The catalog module 304 includes a URL locator 402, a video identification module 404, a verification module interface 406, a thumbnail generation module 408, a related content finder 410 and a response assembly module 412.

The URL locator 402 locates a URL associated with a webpage loaded by a browser 110 executing on a client device 104. In one embodiment, the catalog module 304 receives a URL of a webpage from the client device 104. The URL locator 402 provides the received URL to the video identification module 404. However, if a client device 104 provides a URL of an optimized version of a webpage that does not contain the video, the URL locator 402 identifies an un-optimized version of the webpage. For example, a user may navigate to an optimized web site by selecting a mobile version of the webpage or the browser may be automatically redirected to an optimized site based on the client's user agent. In an instance wherein a user is automatically redirected, the server 102 may receive the un-optimized webpage's URL before the redirection. However, if the server 102 does not get a URL of the un-optimized webpage, the URL locator 402 locates the URL. In one embodiment, the URL locator 402 generates a search query and provides it to a search engine to find an un-optimized version of the webpage. Search queries can include, but are not limited to the title of the webpage or other meta data associated with the webpage. In another embodiment, the URL locator 402 uses crawling techniques to index sites that have mobile optimized version to find a correlation between sites optimized for mobile devices and sites for desktop or laptop computers. In another embodiment, the URL locator can use pattern matching or replacing portions of the URL received from the client 104 to find an un-optimized version of the webpage. For example, a URL address, of 'm.webpage.com' can be changed to 'www.webpage.com.' In yet another embodiment, the URL locator 402 performs a site search using search terms such as page title to identify a URL an un-optimized version of the received URL. In one embodiment, the URL locator 402 interfaces with a browser application 308 executing on the server 102 to load a webpage based on the URL.

Referring back to FIG. 3, a browser application 308 is an application executing on the server 102 and is typically used for loading webpages based on the URLs provided by the URL locator 402. For example, the browser application 308 retrieves a webpage over a network 106. Examples of the browser 108 include, for example, SKYFIRE, GOOGLE CHROME, MOZILLA FIREFOX, APPLE SAFARI, and MICROSOFT INTERNET EXPLORER. In one embodiment, the browser application 308 interfaces with the video identification module 404 as one or more videos load on the webpage retrieved by the browser application 308.

Referring again to FIG. 4, a video identification module 404 identifies playable videos embedded in a webpage. In one embodiment, the video identification module 404 identifies each plugin loaded or created on a webpage. The video identification module 404 maintains a list of all plugins found on a webpage. Additionally, the video identification module 404 prunes plugins from the list that may be advertisements. The video identification module 404 uses heuristics such as dimensions and aspect ratio to identify plugins that are likely to be advertisements. For example, plugins of particular dimensions can be identified as likely banner ads, pop-up ads, etc. The video identification module 404 provides a list of likely videos on a webpage to the verification module 406.

Figure 5:
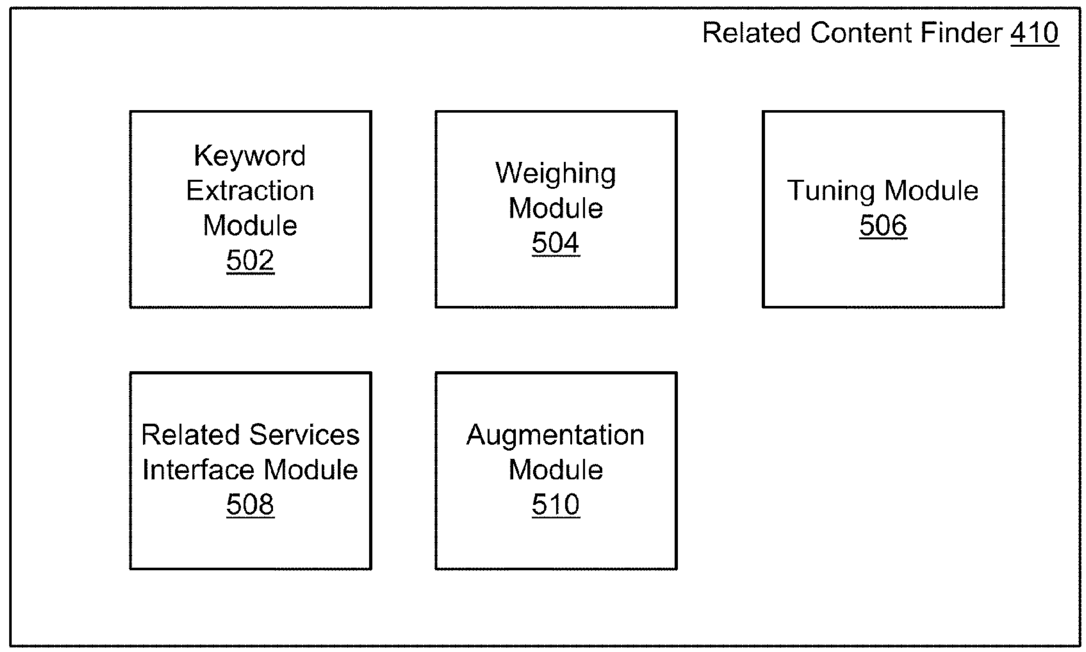
FIG. 5 illustrates one embodiment of a content finder for providing web content to one or more client devices.

The related content finder 410 identifies playable videos related to the content of a webpage provided by the URL locator 402. The related content finder is illustrated in greater detail in reference to FIG. 5. FIG. 5 illustrates one embodiment of a content finder for providing web content to one or more client devices 104. The related content finder module 410 includes a keyword extraction module 502, a weighing module 504, a tuning module 506, related services interface module 508 and augmentation module 510.

The keyword extraction module 502 processes a webpage's content and extracts keywords or phrases. In one embodiment, the extraction module 502 scrapes a variety of information from a webpage, including, but not limited to: text from the webpage that is visible and invisible to the end user, tags present on the webpage, the first header tag (h1, h2, h3, h4, h5) that has text inside it, the URL being viewed by the browser application 308, the HTML <title> tag and text inside <ul> tags. In one embodiment, the keyword extraction module 502 separately captures metadata associated with the text such as whether the text is visible to the end user, font-size font style such as bold or italics, the size or corpus of text on a webpage within a single element. The keyword extraction module 502 sends the extracted data to the weighing module 504.

The weighing module 504 weighs keywords identified by the extraction module 502 based on their occurrence and weighing criteria. In one embodiment, the weighing module 504 identifies a base of words based on the frequency of appearance of the words. A word count for each word may be identified from raw text of a webpage, UL tags, alt tags, the first header and page title. The weighing module 504 assigns a weight to each key word based on their word count from these sources. Additionally, the weighing module 504 removes certain words that are commonly known to provide poor search results, including but not limited to: articles, prepositions, coordinating conjunctions, proper names, month names, days of the week, common internet terms, such as 'duration,' 'email,' 'www,' etc. In other embodiments, the weighing module 504 weighs certain words phrases more than words. The weighing module 504 may also weigh words and phrases based on metadata associated with the text. For example, bolded text may be weighed more heavily than unbolded text. Similarly, if the text is not in the largest corpus of text on a page within a single element. The weighing module 504 weighs search terms and provides the search terms to the tuning module 506.

The tuning module 506 tunes various search parameters based on input received from a user. In one embodiment, the tuning module 506 varies the some or all of the parameters used in weighting the words or phrases. The turning module 506 maintains a record of which queries had a set of tunable parameters and returns both the terms and an identifier that can be used to match a given set of returned terms with the tuning parameters used to generate them. The original search parameters and the tuned parameters are provided to a related services interface module 508.

The related services interface module 508 interfaces with other programs and services to retrieve related content. In one embodiment, a service may include a social networking system wherein the related services interface module 508 interfaces with the social networking system to find content related to keywords provided by the tuning module 506. In another embodiment, the related services interface module 508 interface with one or more search engines and executes a search in the one or more search engines. In one embodiment, the related services interface module 508 provides additional interface elements that can be displayed on the client device 104 and to be delivered with the search results such that a user can rate the search results generated by the related content finder 410.

Referring back to FIG. 4, the verification module 406 processes each plugin on a webpage identified by the video identification module 404, the related content finder 410 and verifies whether each plugin is operational. In an embodiment, the verification module 406 maintains a whitelist of known operational ADOBE FLASH SWF files or URLs, a blacklist of known ADOBE FLASH SWF files that are not operational videos and a pending list wherein the verification module 406 does not know whether a plugin is an operational video player. If a plugin element is present on the whitelist, the verification module 406 identifies the plugin is an operational video player and provides the plugin to the thumbnail generation module 408. Plugins on the black list are generally ADOBE FLASH SWF files that are not videos and may include FLASH applications and games, for example. The blacklisted plugins are not processed further.

If a SWF file or URL is on none of the lists or on the pending list, the verification module 406 identifies whether it is a playable video player. If a plugin loads a valid video file such as FLASH VIDEO (FLV) or MPEG-4 (MP4) the verification module 406 identifies the plug is a valid video player. In one embodiment, the verification module 406 determines the filename extensions of the URL or inspects the header of the file loaded by the plugin to determine if the file is a valid video file. Standard headers, such as 'FLV' are marked for File Based Transcoding (FBT). FBT is described in greater detail in the specification below. In one embodiment, the verification module 406 determines the number of HTTP requests that are outstanding to determine whether a plugin is a valid video player. If the number of HTTP requests is zero, the verification module 406 assumes that the player is in an idle state. For non-autoplay videos, or webpage comprising more than one plugins the verification module 406 execute standard mouse clicks to force the player to play. If after the click, a valid video file is found, the verification module 406 identifies the plugin as a valid video player. In another embodiment, the verification module 406 listens to changes in audio streams associated with the webpage. If no audio is present, the verification module 406 determines that a video is not playing at the plugin. In such an instance, the verification module 406 initiates standard mouse clicks to play a video at the plugin. If audio is detected, the verification module identifies the plugin as a valid playable video. In yet another embodiment, the verification module 406 changes the parameters sent to the plugin. Often, plugins have variables that control autoplay options. The verification module 406 sets those variables to true or some other value to make a non-autoplay video play. If the video plays, the plugin is identified as a valid video player. In one embodiment, the identified valid video players are added to a whitelist, whereas plugins that do not play videos are added to a pending list wherein the plugin is further processed offline.

The verification module 406 performs offline processing for plugins that did not play videos. In one embodiment, the verification module 406 executes bottom left auto-clicks, center clicks, custom clicks etc. to induce the plugin to play a video. In another embodiment, the verification module 406 provides the plugin to a user, such that a user can verify whether the plugin can play a video. For example, the verification module 406 can crop the plugin, highlight it and provide it to the user. The verification module 406 receives a user input indicating whether the plugin is a valid video player. If it is a valid video player, the verification module 406 adds the plugin to a whitelist. On the other hand, if the user indicates that the plugin is not a valid video player, the verification module adds the plugin to a blacklist. If the plugin is a valid video player, the verification module 406 provides the plugin to the thumbnail generation module 408.

The thumbnail generation module 408 generates a thumbnail for each plugin identified as a playable video by the verification module 406. The thumbnail may be sent to a client device 104 and displayed to a user as a visual representation of the video. In one embodiment, the thumbnail generation module 408 performs a check to identify a public API associated with the video. For example, YOUTUBE and DAILYMOTION, among others, provide public API providing a URL to an image associated with the video. In such an instance, the thumbnail generation module 408 identifies the URL and sends it to a client device 104. In another embodiment, if there is a player plugin that handles the video in page, the thumbnail generation module 408 takes screen shots over time to form an animated thumbnail. In one instance the screen shot is taken from having the plugin render to a frame buffer or by screen scraping the image directly from the plugin's window. In such an instance, the animated thumbnail is provided and displayed on the client device 104. If a source file is available for a video, the thumbnail generation module 408 may provide the file to a video decoder and capture images from various points in the video sequence, in one embodiment. The thumbnail generation module 408 may also use an algorithm to identify an image that is most likely to visually interesting or appealing to a viewer. In embodiments wherein the thumbnail generation module 408 saves an image from a video, the image is saved to a web service that can hold the image in a database for some period of time. The web service can provide a URL to the thumbnail generation module 408, wherein the thumbnail generation module 408 sends the URL to the response assembly module 412.

The response assembly module 412 assembles a response to send to the client device 104. In one embodiment, the response comprises a number of missing videos found on a webpage, information identifying each video, a URL of the thumbnail image associated with each video, mouse click information if the video is not auto-play mode and an FBT flag if the source file of the video is known and the streaming module would perform File Based Transcoding (FBT) operation to stream the video to the client device. In one embodiment, the information identifying each video may include a JSON blob. The JSON blob is used to uniquely identify the plugin on the page in case there are multiple plugins on the page. The response assembly module 412 also interfaces with the communications module 302 to send the generated response to the client device.

In one embodiment, the response generated by the catalog module is displayed on a client device 104. The response may be displayed in a variety of user interface elements, for example, as further described in FIGS. 10-12. If a user selects a thumbnail of a video displayed in a response, the user input is provided to the server 102, wherein the communications module 302 provides the user input to the streaming engine 306. The streaming engine 306 is further described with reference to FIG. 6.

Figure 6:
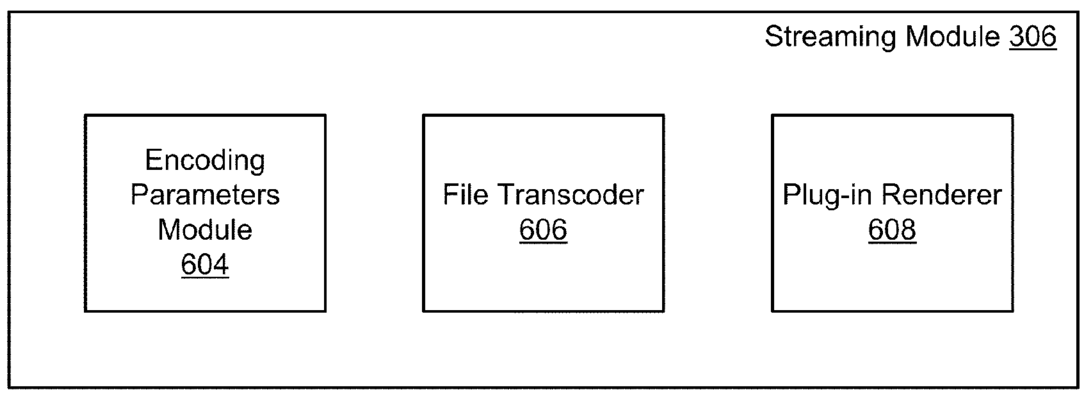
FIG. 6 illustrates one embodiment of a streaming module for providing web content to one or more client devices.

Referring now to FIG. 6, the streaming module 306 streams web content including missing videos and related videos to a client device 104. The streaming module 306 includes an encoding parameters module 604, file transcoder 606 and a plugin renderer 608.

The encoding parameters module 604 selects encoding parameters to transcode a video stream. The encoding parameters are selected based on the client's 104 network configuration, the processing capabilities of the client device 104 and the screen resolution of the client device 104. The encoding parameters include but, are not limited to, video resolution (e.g. 320×320 pixels, 480×320 pixels, etc.), video frame rate, video bitrate, audio sample rate, audio bitrate, mono or stereo, etc. The video frame rate can be specified directly in frames per second, or indirectly by selecting frame rate divisor. The frame rate divisor is used to divide the video frame rate by a specified divisor.

The file transcoder 606 transcodes videos from a webpage. In an instance wherein all the source files or URLs of videos are identified by the catalog module 304 the file transcoder module downloads each video file and transcodes each video file based on encoding parameters provided by the encoding parameters module 604. In another instance, wherein all the source files or URLs of videos are not known, the file transcoder 606 interfaces with a browser application 308 to load user cookies and URL of the webpage containing the video files. As described in the specification above, webpages wherein all the video source files can be identified are flagged with a 'UseFBT' flag by the catalog module 304. The browser application 308 provides FLV, MP4, as well as ADOBE FLASH SWF files, images and XML to the file transcoder 606. In one embodiment, the file transcoder 606 uses a decoding library such as ffmpeg to decode each video and audio frame in the source file. The file transcoder 606 resamples the audio and video to fit the profile parameters provided by the encoding parameters module 604. Additionally, the file transcoder 606 encodes the video and audio frames using one of various encoding methods, including but not limited to H.264 or AAC(+). In one embodiment, the transcoder 606 transcodes each video file on a webpage and streams the transcoded files via the communications module 302.

In one instance, wherein source files for a video are not identified, the video transcoder 606 generates a plugin renderer 608 for each plugin instance. Additionally, the video transcoder 606 creates a time thread to permit the plugin renderer 608 to retrieve frames at a frame rate specified by the encoding parameters module 604. If the plugin is a windowed plugin, the transcoder uses a bit-block image transfer (Bit Blit) process to the contents to an internal frame buffer. If the plugin is a windowless plugin, the transcoder sends a message to the plugin renderer to transfer the contents to the internal frame buffer directly. In one embodiment, each time the internal frame buffer is updated, the plug-in renderer resizes the image and provides it to the file transcoder 608. The transcoder 608 encodes the video as described in the specification above. In this instance, the plugin renderer timestamps each frame in milliseconds in which the frame was retrieved. In one embodiment, the audio subsystem 312 intercepts the audio samples in raw form from the browser application 308. The audio subsystem 312 encodes the audio samples using an audio encoder, such as AAC. The encoded audio frames are written into a shared memory buffer 314 along with a timestamp in milliseconds which corresponds to the time when the samples were retrieved. The communications module streams the audio and video frames based on their timestamps and streams the frames to the client device 104.

Referring back to FIG. 3, the server 102 is also capable of optimizing ADOBE FLASH content when the client 104 has a FLASH PLAYER plugin installed. In such instances, the FLV optimization module 316 intercepts files going to a FLASH PLAYER on the client device 104 and transcodes the files.

In one embodiment, the client device 104 directs the request for an initial SWF file to the server 102. In other embodiments, a network intercept or the client device 104 may direct all content, including ADOBE FLASH, HTML5, progressive download content and adaptive bitrate content such as SILVERLIGHT and HLS to the server 102. The FLV optimization module 316 loads the SWF files and components that the player subsequently loads. The FLV optimization module 316 interfaces with the communications module to send components back to the client device 104. Non-video components may be returned to the client device 104 unaltered in one embodiment or in a compressed format. The FLV optimization module 316 intercepts video elements of the SWF file for processing. In another embodiment, the FLV optimization module intercepts video traffic on the client device 104. As a plugin on the client device 104 attempts to load a video file, the client device 104 redirects the request to the server 102. In another embodiment, a proxy in a carrier's network can redirect video traffic to the server 102.

In one embodiment, the FLV optimization module 316 transcodes a video file. In one embodiment, the FLV optimization module 316 receives files on a video player's playlist. The FLV optimization module 316 selects optimization parameters as described in FIG. 6 in reference to encoding parameters module 604. Additionally, the FLV optimization module 316 may retrieve real-time client feedback, such as network health or capacity to change the encoding parameters. In one embodiment, the FLV optimization module 316 may replace the video file with another SWF element that can contain logic to monitor the video stream and feedback information on the client device 104. The transcoded file is sent to the client device 104 by the communications module 302. In another embodiment, the FLV optimization module 316 outputs transcoded data in a streaming format such as RTMP. In yet another embodiment, the FLV optimization module 316 replaces the SWF file on the client device 104 with another SWF file transcoded by the FLV optimization module 316. In another embodiment, the SWF file optimization module 316 sends the SWF file to the streaming module 306 wherein the streaming module transcodes and streams video files as described in the specification above.

The HTML5 optimization module 318 intercepts and transcodes HTML5 videos. HTML5 videos do not allow for adaptive streaming, based on network health, capacity, the client processing parameters, etc. In one embodiment, the client device 104 provides the routes HTML5 videos to the server 102. In another embodiment, a network intercept routes videos HTML5 videos to the server 102. As described in the specification above, the HTML5 optimization module encodes HTML5 files based on encoding parameters provided by the encoding parameters module 604 and transcodes the file as described in reference to the file transcoding module 306 in FIG. 6.

The advertising module 320 selects and adds advertisements to videos streamed to the client device 104. The advertising module 320 selects an ad based on inputs including, but not limited to, the client device's platform, the location of the client device 104, the identity of a user, content of the webpage requested by a browser, keywords extracted from the webpage, concepts associated with the webpage, user's click history, user's search history, etc. The advertising module 320 selects advertisements that match on or more the parameters listed above. In one embodiment, the places the advertisement on a webpage. The advertisement may be optimized to fit a screen independent of the zoom level of the webpage being displayed on a client device 104. The advertisement may scroll away with the page, disappear based on time or stay on permanently, pop-up from any one edge of a screen, within any user interface elements generated by the augmentation module 114, such as missing videos interface, related videos interface. In one instance, the advertisements may be placed on video players, including splash screen or loading screen of the media player, pre and post video roll. In one embodiment, the advertising module 320 interfaces with the communications module 302 to send advertising information to a client device 104.

Process for Identifying and Streaming Web Content

Figure 7:
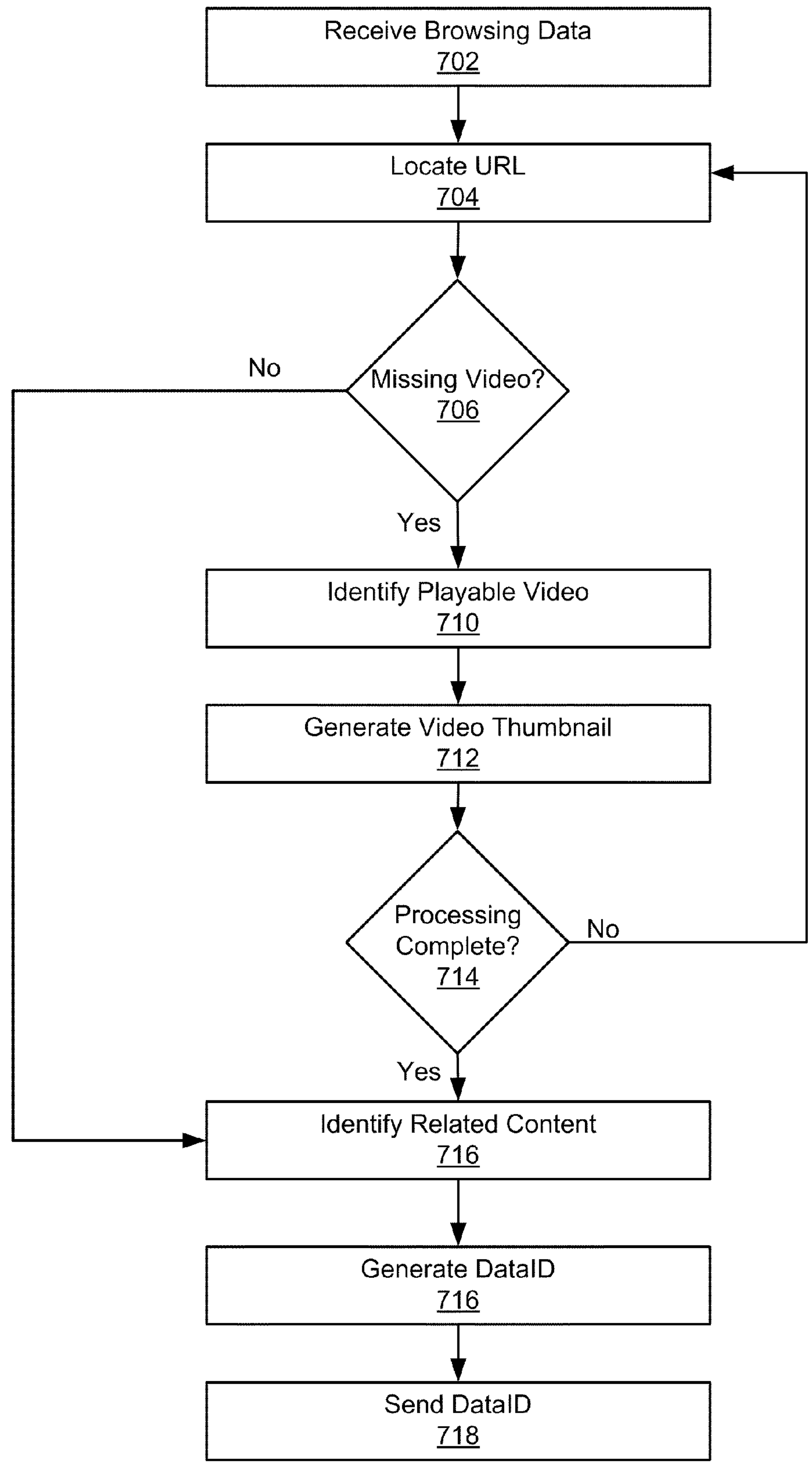
FIG. 7 is a flowchart illustrating a process for cataloging web content to one or more client devices, according to one embodiment.

FIG. 7 is a flowchart illustrating a process for cataloging web content to one or more client devices, according to one embodiment. In one embodiment, the process starts when a server receives 702 browsing data from a client device. The browsing data can include cookies and a URL address of a webpage being loaded on the client device. The process locates 704 URL of an un-optimized version of the webpage. For example, a user may have navigated to a mobile version of a webpage that does not include any videos. In such an instance, the process 704 locates a version of the webpage that includes plugin and video information.

The process identifies plugins on the webpage at the provided URL. For each plugin, the process identifies if the plugin is a missing video 706. A missing video, is a video that cannot be displayed on a client device because a browser executing on the client device does not have a plugin capable of displaying the video or a video that can by optimized by the server 102. If there are no missing videos on the web page, the process identifies 716 content related to the webpage, as discussed in greater detail below.

If the process can identify a missing video 706, the process identifies a playable video 710 associated with the plugin. Playable videos exclude any advertisements or other plugins that are not video players. Additionally, the process generates a video thumbnail based on the identified video. In one embodiment, the process renders the video on a browser executing on the server and screen scrapes images, or renders images to an offscreen buffer that can be used as thumbnails. In other embodiments, the thumbnails can be retrieved from a public API. Once the thumbnail is retrieved for the plugin, the process determines if the process is complete 714 for all the plugins on a webpage. If there are other plugins on the webpage, the process locates 704 a URL for each additional plugin on the webpage. The process continues as described in the specification above for each plugin on the webpage.

If the processing is complete 714 for each plugin on the webpage, the process identifies 716 content related to the webpage. In one embodiment, the related content can include other videos related to the keywords or phrases on the webpage. In other embodiments, the related content includes social networking data associated with a user and/or related to the webpage content. The process may extract keywords or phrases from the webpage and use the keywords on a search engine, wherein the search result is identified 716 as related content. Additionally, the process retrieves thumbnails associated with the identified related content 716. In one embodiment, the process generates 716 a dataID. The dataID includes the missing videos thumbnails, related content thumbnails such that the identified content can be represented in a compact form. The generated dataID is send to the client device 104.

Figure 8:
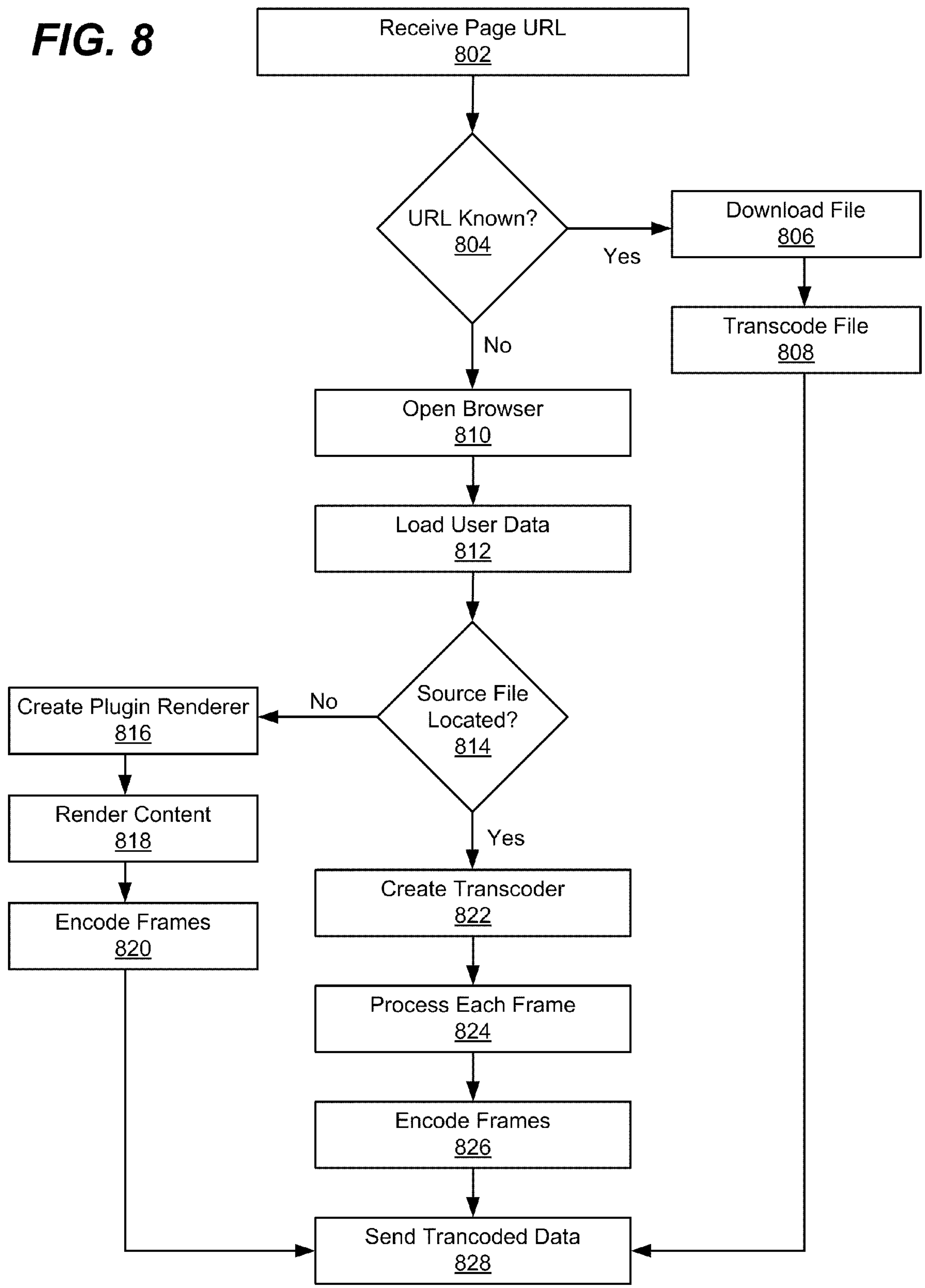
FIG. 8 is a flow chart illustrating a process for providing web content to one or more client devices, according to one embodiment.

FIG. 8 is a flow chart illustrating a process for providing web content to one or more client devices, according to one embodiment. The process starts once the server receives a request to play a video on a client device 104. In one embodiment, the server receives a URL for a webpage displaying a video. The process determines if a URL is known 804 for each video file on the webpage. If the URL is known, the process downloads 806 the file and transcodes 808 the file based encoding parameters such as network health and network capacity. The transcoded file is sent 828 to the client device. In another embodiment, the process streams 828 the transcoded video to the client device.

If the URL for one or more videos is unknown 804, the process opens 810 a browser instance on the server and loads 812 user data including cookies received from the client. In one embodiment, the process determines if the plugin has a source file. If the source file is not located, the process creates 816 a plugin renderer for each plugin. The plugin renderer renders 818 the video content, wherein the process encodes 820 the video frames based on encoding parameters. The transcoded video frames are sent 828 to the client device 104.

If the source file is located for the plugin, the process creates 822 a transcoder for each plugin on the webpage. Each frame of the video is processed 824 and encoded 826. The processing step includes resizing video frames and the encoding step includes transcoding video frames based on encoding parameters such as network health and network capacity. The transcoded data is sent to the client device 104. In one embodiment, the transcoded data is streamed to the client device 104 using HTTP or RTMP communications protocols.

Figure 9:
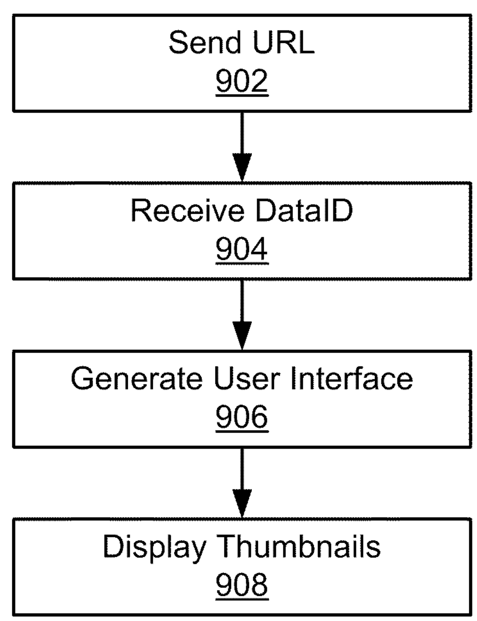
FIG. 9 is a flow chart illustrating a process for displaying web content received from a server, according to one embodiment.
Figure 10:
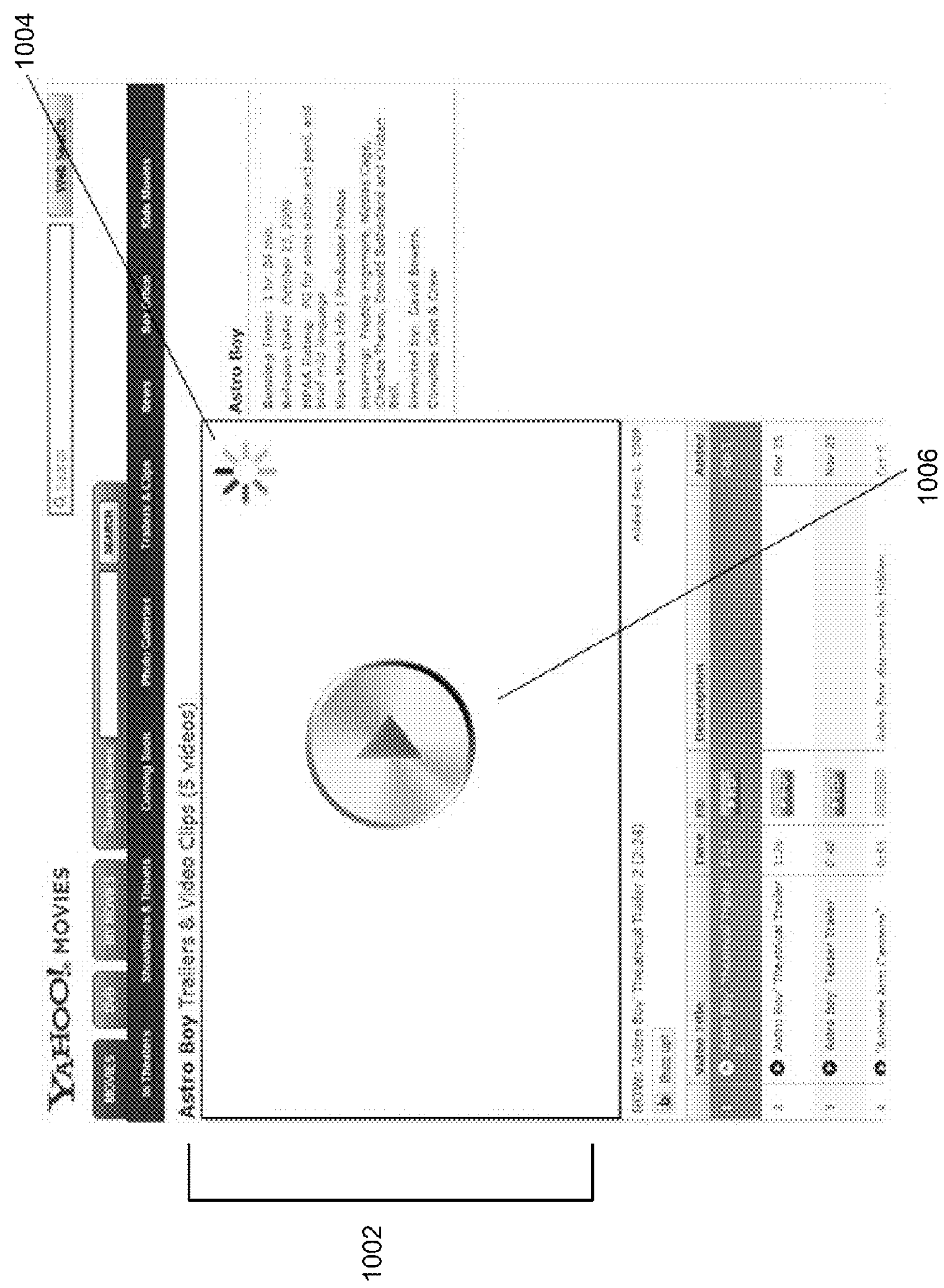
FIG. 10 illustrates one embodiment of a user interface for displaying catalog data received from a server.
Figure 11:
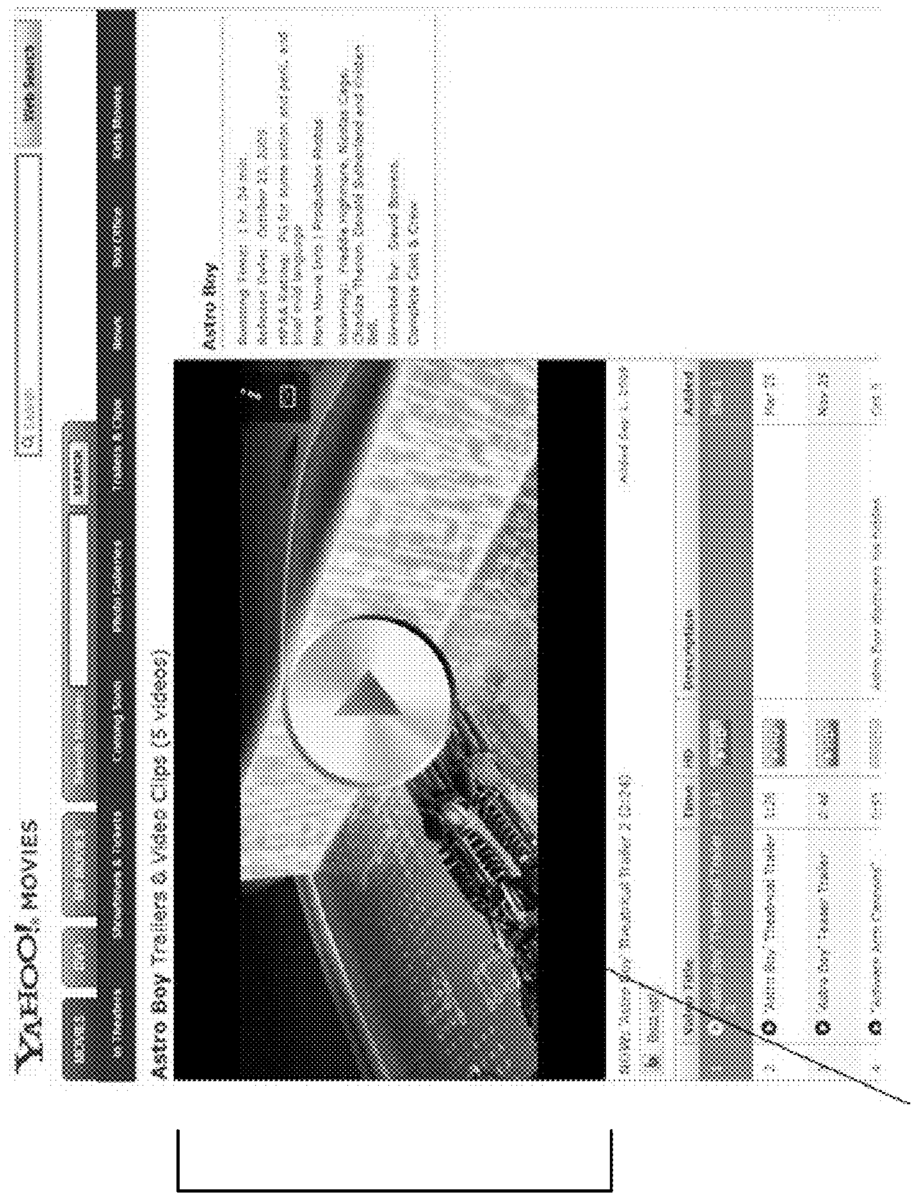
FIG. 11 illustrates one embodiment of a user interface for displaying a thumbnail of web data received from a server.

FIG. 9 is a flow chart illustrating a process for displaying web content received from a server, according to one embodiment. FIGS. 10-12 provide example illustrations of user interfaces displayed on the client device. FIGS. 9-12 are discussed concurrently below.

The client device sends 902 a webpage URL displayed on a browser application. In one embodiment, the client device sends cookies and other user data to the server 102. Responsive to the sending the webpage URL, the client device receives 904 a dataID. A dataID includes thumbnails or URLs to locate the thumbnails of any missing videos on the webpage, thumbnails of related videos and related content. If the dataID contains links to additional information, the client downloads this information now. This process can be asynchronous, allowing the user interface to update as the content is downloaded. The process continues by generating 906 a user interface displaying the dataID contents. FIG. 10 illustrates one embodiment of a user interface for displaying dataID contents received from a server. FIG. 10 illustrates a video player frame 1002. The user interface element may also include a processing animated image 1004 indicating that a video can be loaded on the webpage. Additionally, the video may also include a button 1006 indicating that the user can play a video displayed on the webpage.

FIG. 11 illustrates one embodiment of a user interface for displaying a thumbnail of web data received from a server. In one embodiment, the process displays a thumbnail 1102 within a video player. The process can also includes a play button 1104 indicating that a user can play the video on the client device 104. FIG. 12 illustrates one embodiment of a user interface for displaying thumbnails of two videos recovered from a webpage. In yet another embodiment, the process may display that missing video as a broken link 1202 indicating that the user cannot play the video on the client. The process can also display the thumbnails provided by the dataID in a pop-up user interface 1204. For example, the process can display a 'videos' toolbar on the browser. A pop-up window 1204 can show one or more video thumbnails received from the server 102. In one embodiment, the process may also streaming video content to the user on the client device responsive to a user input indicting a command to play the video files.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as described with FIGS. 1, 3, 4, 5 and 6. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method, e.g., those described in FIGS. 7, 8 and 9, may be performed by one or processors, e.g., processor 102 or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., computer memory 204), e.g., the processes described in FIGS. 7, 8 and 9. These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for identifying and displaying videos on a client device that does not have plugins for displaying videos on a webpage through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for identifying videos missing from an optimized version of a target webpage, the method comprising:

receiving, at a server, browsing data from the client device including a destination uniform resource locator (URL) associated with the optimized version of the target webpage, the optimized version of the target webpage optimized for a display of a mobile device;

identifying a URL corresponding to a non-optimized version of the target webpage, the non-optimized version not optimized for the display of the mobile device;

identifying videos missing from the optimized version of the target webpage that are present in the non-optimized version of the target webpage;

identifying a source file for a given missing video on the non-optimized version of the target webpage by identifying a missing URL in the optimized version of the webpage, where the missing URL is present in the non-optimized version and associated with the given missing video;

retrieving a thumbnail for representing the given video to display on the client device;

sending the thumbnail to the client device;

transcoding the source file corresponding to the given missing video responsive to receiving an indication of a user input command selecting the given video and encoding parameters based on the client device capability; and streaming the transcoded source file corresponding to the missing video to the client device.

2. The method of claim 1, wherein identifying missing videos further comprises identifying plugins on the target webpage and pruning plugins that do not correspond to video content.

3. The method of claim 1, wherein retrieving a thumbnail for representing the given video comprises capturing an image from the source file corresponding to the video or retrieving an image from a public API corresponding to the video.

4. The method of claim 1, wherein indentifying the URL corresponding to the non-optimized version of the target webpage comprises:

extracting keywords from the optimized version of the target webpage;

performing a search based on the extracted keywords; and retrieving content based on the search results.

5. The method of claim 4, wherein the retrieved content includes video source files and social networking system content.

6. The method of claim 1, wherein transcoding the source file comprises identifying encoding parameters, the encoding parameters including the client device capabilities and a communications network capability.

7. The method of claim 1, wherein the transcoding the source file further comprises:

rendering source file data; and capturing video frames from the rendered source file data to generate the transcoded source file.

8. The method of claim 7, wherein capturing video frames comprises using a screen scraping method.

9. A system for identifying videos missing from an optimized version of a target webpage, the system comprising:

a computer processor for executing executable computer program code;

a computer-readable storage medium containing the executable computer program code for performing a method comprising:

receiving, at a server, browsing data from the client device including a destination uniform resource locator (URL) associated with the optimized version of the target webpage, the optimized version of the target webpage optimized for a display of a mobile device;

identifying a URL corresponding to a non-optimized version of the target webpage, the non-optimized version not optimized for the display of the mobile device;

identifying videos missing from the optimized version of the webpage that are present in the non-optimized version of the target webpage;

identifying a source file for a given missing video on the non-optimized version of the target webpage by identifying a missing URL in the optimized version of the webpage, where the missing URL is present in the non-optimized version and associated with the given missing video;

retrieving a thumbnail for representing the given video to display on the client device;

sending the thumbnail to the client device;

transcoding the source file corresponding to the given missing video responsive to receiving an indication of a user input command selecting the given video and encoding parameters based on the client device capability; and streaming transcoded source file corresponding to the missing video to the client device.

10. The system of claim 9, wherein identifying missing videos further comprises identifying plugins on the target webpage and pruning plugins that do not correspond to video content.

11. The system of claim 9, wherein retrieving a thumbnail for the video comprises capturing an image from the source file corresponding to the video or retrieving an image from a public API corresponding to the video.

12. The system of claim 9, wherein indentifying the URL corresponding to the non-optimized version of the target webpage comprises:

extracting keywords from the optimized version of the target webpage;

performing a search based on the extracted keywords; and retrieving content based on the search results.

13. The system of claim 9, wherein the retrieved content includes video source files and social networking system content.

14. The system of claim 9, wherein transcoding the source file comprises identifying encoding parameters, the encoding parameters including the client device capabilities and a communications network capability.

15. The system of claim 9, wherein the transcoding the source file further comprises:

rendering source file date, and capturing video frames from the rendered source file data to generate the transcoded source file.

16. The system of claim 15, wherein capturing video frames comprises using a screen scraping method.

17. A computer program product for identifying video files missing from an optimized version of a target webpage, the computer program product comprising a non-transitory computer-readable storage medium containing computer program code for:

receiving, at a server, browsing data from the client device including a destination uniform resource locator (URL) associated with the optimized version of the target webpage, the optimized version of the target webpage optimized for a display of a mobile device;

identifying a URL corresponding to a non-optimized version of the target webpage, the non-optimized version not optimized for the display of the mobile device;

identifying videos missing from the optimized version of the target webpage that are present in the non-optimized version of the target webpage;

identifying a source file for a given missing video on the non-optimized version of the target webpage by identifying a missing URL in the optimized version of the webpage, where the missing URL is present in the non-optimized version and associated with the given missing video;

retrieving a thumbnail for representing the given video to display on the client device;

sending the thumbnail to the client device;

transcoding the source file corresponding to the given missing video responsive to receiving an indication of a user input command selecting the given video and encoding parameters based on the client device capability; and streaming the transcoded source file corresponding to the missing video to the client device.

18. The computer readable medium of claim 17, wherein identifying missing videos further comprises identifying plugins on the target webpage and pruning plugins that do not correspond to video content.

19. The computer readable medium of claim 17 retrieving a thumbnail for the video comprises capturing an image from the source file corresponding to the video or retrieving an image from a public API corresponding to the video.

20. The computer readable medium of claim 17, wherein indentifying the URL corresponding to the non-optimized version of the target webpage comprises:

extracting keywords from the optimized version of the target webpage;

performing a search based on the extracted keywords; and retrieving content based on the search results.

21. The computer readable medium of claim 17, wherein the retrieved content includes video source files and social networking system content.

22. The computer readable medium of claim 17, wherein transcoding the source file comprises identifying encoding parameters, the encoding parameters including the client device capabilities and a communications network capability.

23. The computer readable medium of claim 17, wherein transcoding the source file further comprises:

rendering source file date; and capturing video frames from the rendered source file data to generate the transcoded source file.

24. The computer readable medium of claim 23, wherein capturing video frames comprises using a screen scraping method.

* * * * *

UNITED STATES PATENT AND TRADEMARK OFFICE

CERTIFICATE OF CORRECTION

PATENT NO. : 8,468,130 B2
APPLICATION NO. : 13/079699
DATED : June 18, 2013
INVENTOR(S) : Bhandari et al.

It is certified that error appears in the above-identified patent and that said Letters Patent is hereby corrected as shown below:

In the Claims:
Column 19, line 61, delete "indentifying," and insert --identifying--.
Column 20, line 57, delete "indentifying," and insert --identifying--.

Signed and Sealed this
Twenty-eighth Day of January, 2014

Michelle K. Lee
*Deputy Director of the United States Patent and Trademark Office*